UNITED STATES PATENT OFFICE.

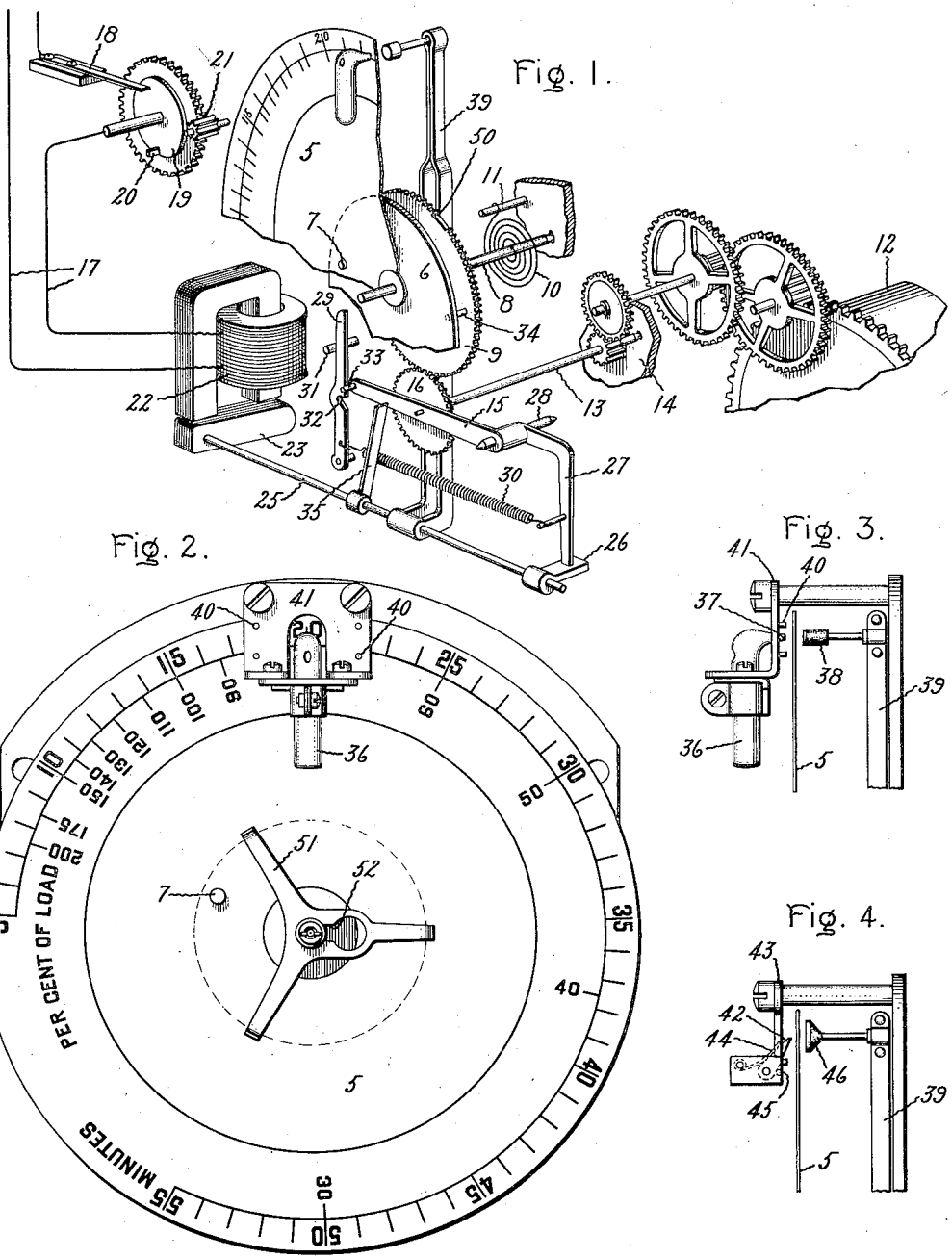

WILLARD E. PORTER, OF LYNN, MASSACHUSETTS, ASSIGNOR TO GENERAL ELECTRIC COMPANY, A CORPORATION OF NEW YORK.

DEMAND-INDICATOR.

1,138,785.  Specification of Letters Patent.  Patented May 11, 1915.

Application filed August 1, 1913. Serial No. 782,444.

*To all whom it may concern:*

Be it known that I, WILLARD E. PORTER, a citizen of the United States, residing at Lynn, in the county of Essex, State of Massachusetts, have invented certain new and useful Improvements in Demand-Indicators, of which the following is a specification.

My invention relates to demand indicators and particularly to indicators of that type disclosed in the patent application of Lewis T. Robinson and John T. Dempster filed March 18, 1913, Serial No. 755,196, and in my patent application filed March 18, 1913, Serial No. 755,135.

The object of my present invention is to provide certain novel features of construction in demand indicators and particularly to provide an improved construction of demand indicator of the type above identified.

Further objects of my invention are to generally improve the mechanical features of construction of the demand indicator described in the aforementioned patent applications, and will be described in detail hereinafter.

The novel features which I believe to be patentably characteristic of my invention are definitely indicated in the claims appended hereto.

The details of construction and mode of operation of my improved type of demand indicator will be understood from the following description taken in connection with the accompanying drawings in which:

Figure 1 is a diagrammatic view in perspective of a demand indicator embodying the novel features of my invention; Fig. 2 is a plan view of the indicator showing the movable record sheet; Fig. 3 is a detail view illustrating one device for imparting a record mark on the record sheet, and Fig. 4 is a modified construction of marking device.

I have illustrated, in the accompanying drawing, my invention applied to a demand indicator employing as a unit of reference a predetermined quantity of metered energy. In this type of indicator the times during which equal and predetermined quantities of energy are consumed are recorded on a suitable chart or record sheet. The equal and predetermined quantities of metered energy are spoken of in the art as equal intervals of metered energy, and I have employed the term interval throughout the specification and claims of this application in this sense.

It will be readily understood by those skilled in the art that certain features of my present invention are not limited to a demand indicator employing as a unit of reference an equal interval of metered energy, but on the other hand these features of my invention are equally applicable to any of the known types of demand indicators.

My improved type of demand indicator, as illustrated in the accompanying drawings, comprises a movable record sheet 5. As shown in the drawings this record sheet is preferably circular and is arranged to be rotated about its center as an axis. The record sheet may be of any suitable material such as reasonably stiff paper, and is adapted to be easily and conveniently mounted upon a supporting disk 6. The supporting disk 6 has a guide pin 7 which is arranged to extend through a guide hole in the record sheet in order to accurately position the record sheet with respect to the supporting disk. A spring member 51 is arranged to securely hold the record sheet 5 in engagement with the supporting disk 6. As shown in Fig. 2 of the drawings, the spring member has three equally spaced arms, and is provided with a slot 52 having an enlarged end portion so that the member may be easily removed from the shaft carrying the disk 6.

The supporting disk 6 is rigidly secured to a pivotally mounted shaft 8. A gear member 9 is also rigidly secured to the shaft 8, and when driven turns the supporting disk 6 and the record sheet 5 in a counter-clockwise direction, as the indicator is viewed from the front. A control spring 10 has one end secured to the shaft 8 and the other end secured to a fixed part 11 of the indicator. The spring 10 tends to maintain, or return, the record sheet to an initial or zero position. The determination of this initial position will be described more fully hereinafter.

The record sheet 5 is driven at a constant or uniform speed by means of a constant speed driving mechanism 12. In the drawings I have diagrammatically illustrated a clock-work mechanism of the well known type for driving the record sheet. It will be understood, however, that any other type of constant speed driving mechanism, as for example, a constant speed electric motor, may be employed in place of the clock-work mechanism illustrated in the drawings.

The constant speed driving mechanism 12 drives a rotatable shaft 13 which is pivoted at one end in a fixed part 14 of the indicator and is mounted at the other end in a lever member 15. A gear member 16 is rigidly secured to the shaft 13 at the lever-mounted end of the shaft, and is arranged to mesh with the gear member 9.

The gear members 9 and 16 are arranged to be operatively disconnected at the end of predetermined intervals of metered energy. To this end I provide a pair of coöperating contacts controlling an electric circuit 17. These contacts comprise a relatively fixed spring contact member 18 and a rotatable metallic disk 19 having a contact finger 20. The disk 19 and finger 20 are rotated by the revolving shaft of an electric meter element through the coöperation of the gears 21 in the well known manner. Each time that a predetermined quantity of electric energy has been metered the contact finger 20 will engage the spring contact member 18 and current, supplied by any convenient source, will flow in the circuit 17. The winding of an electromagnet 22 is included in the circuit 17. The electromagnet is provided with a movable armature 23 which is rigidly secured to a bar 25. A dog 26 is rigidly secured to the bar 25, and is arranged to communicate a movement of the armature 23 to the lever 15 by means of an L-shaped arm 27 secured to, or integral with, the lever 15. The lever 15 and L-shaped arm 27 are secured to a pivoted shaft 28 which acts as the fulcrum of the lever. A pivoted arm 29 is connected by a spring 30 to the L-shaped arm 27. The movement of the arm 29 in one direction is limited by a fixed stop 31. The arm 29 has a notch 32 which is adapted to engage a pin 33 at the end of the lever 15. The notch 32 in the arm 29 and the pin 33 coöperate to form a catch or lock device for holding the gear members 9 and 16 operatively disconnected until the record sheet has returned to its initial position. This will be understood from the following description of the operation of my improved type of demand indicator: At the end of the metering of a predetermined quantity of energy the contacts 20 and 18 will engage and the electromagnet 22 will thereupon be energized. The electromagnet when energized attracts its armature 23, thereby turning the rod 25 and moving the dog 26 upwardly. The engagement of the dog 26 with the L-shaped arm 27 moves the lever 15 and disengages gear member 16 from gear member 9. The pin 33 at the end of the lever 15 moves downwardly and engages in the notch 32. The spring 30 pulls the arm 29 toward the L-shaped arm 27 and thus insures the catching of pin 33 in notch 32. As long as the pin 33 is held in the notch 32 gear members 16 and 9 will be maintained operatively disconnected. When the operative connection between gear member 9 and gear member 16 is interrupted the gear member 9 is free to respond to the influence of the control spring 10. This spring acts to turn the gear member and consequently the record sheet in a clock-wise direction and thus to return the record sheet to its initial position. Just as the record sheet reaches its initial position a pin 34, secured to the supporting disk 6, is arranged to strike the arm 29. The force of this impact is sufficient to move the arm against the coöperating fixed stop 31 thereby releasing the pin 33 of lever 15 from the notch 32. The engagement of the pin 34 with the arm 29 and with the fixed stop 31 determines the initial or zero position of the record sheet. When the pin 34 releases pin 33 from the notch 32 the spring 30 operates to place gear members 9 and 16 in operative engagement. At the same time an arm 35 rigidly secured to the rod 25 moves under the lever 15 and positively holds the gear members 9 and 16 in operative connection. When the armature 23 moves upon the energization of the electromagnet 22 the arm 35 is withdrawn from its supporting position beneath the lever 15 and thus does not interfere with the operations hereinbefore described. During the metering of the predetermined intervals of energy the record sheet 5 is driven at a uniform speed by the constant speed driving mechanism 12 and the intermeshing gears 16 and 9. At the end of the metering of an interval of energy a record mark is imparted on the record sheet. In Figs. 3 and 4 of the drawings I have illustrated two means for imparting a record mark on the record sheet. In Fig. 3, I have shown a suitably supported ink cup 36 having a marking point 37 of the well known type arranged on one side of the record sheet 5. On the other side of the record sheet and opposite the marking point 37 is a pad or hammer member 38, preferably made of leather or similar material. The pad 38 is secured at the upper end of a lever 39 and the lower end of the lever is rigidly secured to the bar 25. When the electromagnet 22 is energized the lever is moved by the armature 23 and bar 25, and the pad 38 is forced toward the marking point 37 to impart a record mark on the record sheet.

In order to insure the withdrawal of the point 37 from the surface of the record sheet 5 before the latter starts to return to its initial position, thereby avoiding smutching of the ink on the record sheet, I provide four pins 40, which are rigidly secured in a bracket 41 and surround the marking point 37, as shown in Figs. 2 and 3. The pins 40 thus provide points of support for the record sheet 5 when the pad 38 is forced toward the marking device. It will be observed from Fig. 3 of the drawings that the marking point 37 is somewhat below the plane in which the extremities of the pins 40 lie. The record sheet 5 must therefore be slightly depressed between the pins 40 before it touches the marking point 37. When the gear members 9 and 16 are disengaged the record sheet tends to return to its initial position. As long as the electromagnet is energized, however, the friction of the record sheet between the pins 40 and the pad 38 will maintain the record sheet stationary. When the electromagnet is deënergized the pad 38 will recede from the marking point 37 and pins 40, and the record sheet will be out of contact with the marking point 37 before the friction between the pins 40 and the pad 38 is sufficiently reduced to enable the record sheet to return to its initial position. By this means a clean and perfect dot of ink is obtained on the record sheet.

In Fig. 4 I have shown a modified marking device. The record sheet employed in the modification illustrated in Fig. 4 has a specially prepared surface which is adapted to be marked upon by a metallic marking point of copper, brass, or similar metal. A metallic marking point or pencil 42 is mounted in a bracket 43 upon one side of the record sheet. The marking point 42 is pressed by a spring 44 against a fixed stop 45. On the other side of the record sheet and opposite the metallic marking point 42 is a pad 46, similar to the pad 38, and similarly secured to the lever 39. When the electromagnet 22 is energized the pad 46 is forced toward the marking point 42. The pressure between the pad 46 and the marking point 42 imparts a short record mark on the specially prepared paper of the record sheet 5. The spring pressed mounting of the marking point 42 permits a record mark of suitable length to be made on the record sheet.

The record sheet 5 moves at uniform speed, and I prefer to provide the record sheet with a scale having graduations indicating the distance traveled by the record sheet in certain units of time. To this end I provide near the outer edge of the record sheet a series of graduations indicating minutes, as shown in Fig. 2 of the drawings. These graduations then serve to indicate the lengths of time during which predetermined and equal quantities of electric energy are metered. Adjacent the scale having graduations of time is a second scale having graduations indicative of the demand in electric units. The graduations on the demand scale are marked on the record sheet "Per cent. of load." These graduations are determined so that the record sheet will be returned to its initial position at the end of fifteen minutes when the rate of consumption of energy being metered equals the rated capacity of the meter. In other words when the current flowing through the meter is equal to the rated current capacity of the meter the predetermined quantity of energy will be metered in 15 minutes and a record mark will be imparted on the record sheet. This point on the record sheet, corresponding to the 15 minute mark of the time scale, is marked 100 on the demand scale. The demand scale then indicates the average rate of consumption of energy, or average rate of flow of current, during each or any predetermined energy interval in units of the per cent. of the rated full load capacity of the meter. For example, if the meter is rated as a 10 ampere meter and a record mark is obtained at point 150 on the demand scale it is known that the predetermined interval of energy was metered in 10 minutes, and that the average rate of flow of current during this energy interval was 150 per cent. of 10 amperes, or 15 amperes. Obviously any desired time interval may be taken to refer the 100 per cent. mark of the demand scale to.

In order to prevent the continued rotation of the record sheet in case the predetermined interval of energy is not metered before the record sheet completes one revolution I provide a section 50 of gear member 9 with no teeth. When the gear member 9 has made about one complete revolution the gear member 16 engages in the toothless section 50 of gear member 9, and will rotate idly therein until contact is finally made by the contact members 20 and 18.

The paper record chart or sheet 5 is arranged to be conveniently removed or exchanged without interfering with the operation of the indicator and without danger of obtaining an erroneous record mark as a consequence of such removal or exchange. The spring member 51 is removed from the shaft 8 by means of the slot 52 having the enlarged end portion. The old record sheet can then be removed from the supporting disk 6 and a new one accurately positioned thereon. During this exchange of record sheets the relative position of the gear members 16 and 9 remains unchanged, since these members are positively and securely locked in mesh by the arm 35. If the arm 35 is omitted there is danger that the gears 16 and 9 will be disconnected during the exchange of record sheets, and the record mark obtained at the end of that particular energy interval will obviously be erroneous.

I have herein described and illustrated the best embodiments of the features of my invention now known to me. Various modifications in the details of construction of the features of my invention will be apparent to those skilled in the art. I do not wish, therefore, to be limited to the precise construction shown herein to illustrate my invention, but I aim in the appended claims to cover all modifications thereof which are within the spirit and scope of my invention.

What I claim as new and desire to secure by Letters Patent of the United States, is:—

1. A demand indicator comprising in combination a movable record sheet having an initial position, means for moving said record sheet, means for returning said record sheet to its initial position at predetermined intervals, and a marking device operatively related to said record sheet and adapted to impart a record mark on said record sheet at the end of each of said predetermined intervals.

2. A demand indicator comprising in combination a circular record sheet having an initial position and adapted to be rotated about its center as an axis, means for rotating said record sheet, means for returning said record sheet to its initial position at predetermined intervals, and a marking device operatively related to said record sheet and adapted to impart a record mark on said record sheet at the end of each of said predetermined intervals.

3. A demand indicator comprising in combination a movable record sheet having an initial position, means for moving said record sheet, a marking device arranged on one side of said record sheet, a pad arranged on the other side of said record sheet, said marking device and said pad being relatively movable toward each other, and means actuated at predetermined intervals for returning said record sheet to its initial position and for effecting a relative movement of said marking device and said pad to impart a record mark on said record sheet.

4. A demand indicator comprising in combination a movable record sheet having an initial position, means for moving said record sheet, a stationary marking device arranged on one side of said record sheet, a pivotally mounted pad arranged on the other side of said record sheet and opposite said marking device, and means actuated at predetermined intervals for returning said record sheet to its initial position and for forcing said pad toward said marking device to impart a record mark on said record sheet.

5. A demand indicator comprising in combination a movable record sheet having an initial position, a driving mechanism adapted to be operatively connected to said record sheet, means for interrupting the operative connection between said driving mechanism and said record sheet at predetermined intervals, means for positively insuring the operative connection between said driving mechanism and said record sheet except during the interruptions occasioned by said last mentioned means, a marking device operatively related to said record sheet and adapted to impart a record mark on said record sheet at the end of each of said predetermined intervals, and means for returning said record sheet to its initial position when the operative connection between said driving mechanism and said record sheet is interrupted.

6. A demand indicator comprising in combination a movable record sheet having an initial position, a gear member operatively secured to said record sheet, a driving mechanism, a lever, a second gear member mounted on said lever and adapted to be driven by said mechanism and to mesh with said first mentioned gear member, means tending to return said record sheet to its initial position, means for moving said lever and for disengaging said gear members at predetermined intervals, and means coöperating with said last mentioned means for positively holding said gear members in mesh except during the interruptions occasioned by said last mentioned means and a marking device operatively related to said record sheet and adapted to impart a record mark on said record sheet at the end of each of said predetermined intervals.

7. A demand indicator comprising in combination a movable record sheet having an initial position, said record sheet having a surface adapted to be marked upon by a metallic marking pencil, a spring pressed metallic marking pencil arranged on one side of said record sheet, a pad arranged on the other side of said record sheet and opposite said marking device and adapted to move toward said marking pencil, and means actuated at predetermined intervals for returning said record sheet to its initial position and for forcing said pad toward said marking pencil to impart a record mark on said record sheet.

8. A demand indicator comprising in combination a movable record sheet having an initial position, a constant speed driving mechanism adapted to be operatively connected to said record sheet, means controlled by an electric meter element for returning said record sheet to its initial position at the end of predetermined intervals of metered energy, and a marking device operatively related to said record sheet and adapted to impart a record mark on said record sheet at the end of each of said intervals of metered energy.

9. A demand indicator comprising in combination a circular record sheet having an initial position and adapted to be rotated about its center as an axis, a constant speed driving mechanism adapted to be operatively connected to said record sheet, means controlled by an electric meter element for returning said record sheet to its initial position at the end of predetermined intervals of metered energy, and a marking device operatively related to said record sheet and adapted to impart a record mark on said record sheet at the end of each of said intervals of metered energy.

10. A demand indicator comprising in combination a movable record sheet having an initial position, a constant speed driving mechanism adapted to be operatively connected to said record sheet, means controlled by an electric meter element for interrupting the operative connection between said driving mechanism and said record sheet at the end of predetermined intervals of metered energy, means for returning said record sheet to its initial position when the operative connection between said driving mechanism and said record sheet is interrupted, and a marking device operatively related to said record sheet and adapted to impart a record mark on said record sheet at the end of each of said intervals of metered energy.

11. A demand indicator comprising in combination a circular record sheet having an initial position and adapted to be rotated about its center as an axis, a constant speed driving mechanism adapted to be operatively connected to said record sheet, means controlled by an electric meter element for interrupting the operative connection between said driving mechanism and said record sheet at the end of predetermined intervals of metered energy, means for returning said record sheet to its initial position when the operative connection between said driving mechanism and said record sheet is interrupted, means for holding said driving mechanism and said record sheet operatively disconnected until said record sheet has returned to its initial position, and a marking device operatively related to said record sheet and adapted to impart a record mark on said record sheet at the end of each of said intervals of metered energy.

12. A demand indicator comprising in combination a movable record sheet having an initial position, a constant speed driving mechanism adapted to be operatively connected to said record sheet, a marking device arranged on one side of said record sheet, a pad arranged on the other side of said record sheet, said marking device and said pad being relatively movable toward each other, means controlled by an electric meter element for interrupting the operative connection between said driving mechanism and said record sheet and for effecting a relative movement of said marking device and said pad to impart a record mark on said record sheet, and means for returning said record sheet to its initial position when the operative connection between said driving mechanism and said record sheet is interrupted.

13. A demand indicator comprising in combination a movable record sheet having an initial position, a constant speed driving mechanism adapted to be operatively connected to said record sheet, a marking pencil arranged on one side of said record sheet, a pad arranged on the other side of said record sheet and opposite said marking pencil and mounted to move toward said marking pencil, means controlled by an electric meter element for interrupting the operative connection between said driving mechanism and said record sheet and for forcing said pad toward said marking pencil to impart a record mark on said record sheet, and means for returning said record sheet to its initial position when the operative connection between said driving mechanism and said record sheet is interrupted.

14. A demand indicator comprising in combination a circular record sheet having an initial position and adapted to be rotated about its center as an axis, a constant speed driving mechanism adapted to be operatively connected to said record sheet, a marking pencil arranged on one side of said record sheet, a pad arranged on the other side of said record sheet and opposite said marking pencil, said pencil and pad being relatively movable toward each other, means controlled by an electric meter element for interrupting the operative connection between the driving mechanism and the record sheet and for effecting a relative movement of the marking pencil and the pad toward each other to impart a record mark on said record sheet, and means for returning said record sheet to its initial position when the operative connection between the driving mechanism and the record sheet is interrupted.

15. A demand indicator comprising in combination a movable record sheet having an initial position, a constant speed driving mechanism adapted to be operatively connected to said record sheet, a stationary marking device arranged on one side of said record sheet, a pivotally mounted pad arranged on the other side of said record sheet and opposite said marking device, means controlled by an electric meter element for interrupting the operative connection between said driving mechanism and said record sheet and for forcing said pad toward said marking device to impart a record mark on said record sheet, and means for returning said record sheet to its initial position when the operative connection between said driving mechanism and said record sheet is interrupted.

16. A demand indicator comprising in combination a movable record sheet having an initial position, a constant speed driving mechanism adapted to be operatively connected to said record sheet, means controlled by an electric meter element for returning said record sheet to its initial position at the end of predetermined intervals of metered energy, means for positively insuring the operative connection between said driving mechanism and said record sheet except during the operations of said last mentioned means, and a marking device operatively related to said record sheet and adapted to impart a record mark on said record sheet at the end of each of said intervals of metered energy.

17. A demand indicator comprising in combination a circular record sheet having an initial position and adapted to be rotated about its center as an axis, a constant speed driving mechanism adapted to be operatively connected to said record sheet, a marking device arranged on one side of said record sheet, a pad arranged on the other side of said record sheet and opposite said marking device, said marking device and said pad being relatively movable toward each other, means controlled by an electric meter element for interrupting the operative connection between said driving mechanism and said record sheet and for effecting a relative movement of said marking device and said pad to impart a record mark on said record sheet, means for positively insuring the operative connection between said driving mechanism and said record sheet except during the interruptions occasioned by said last mentioned means, for returning said record sheet to its initial position when the operative connection between said driving mechanism and said record sheet is interrupted.

18. A demand indicator comprising in combination a circular record sheet having an initial position and adapted to be rotated about its center as an axis, a constant speed driving mechanism adapted to be operatively connected to said record sheet, a stationary marking device arranged on one side of said record sheet, a pivotally mounted pad arranged on the other side of said record sheet and opposite said marking device, means controlled by an electric meter element for interrupting the operative connection between said driving mechanism and said record sheet and for forcing said pad toward said marking device to impart a record mark on said record sheet, means for returning said record sheet to its initial position when the operative connection between the driving mechanism and the record sheet is interrupted, and means for holding the driving mechanism and the record sheet operatively disconnected until the record sheet has returned to its initial position.

19. A demand indicator comprising in combination a movable record sheet having an initial position, a driving mechanism adapted to move said record sheet, a stationary marking device arranged on one side of said record sheet, a lever having a pad arranged on the other side of said record sheet and opposite said marking device, an electromagnet having a movable armature operatively connected to said lever so that the movement of said armature forces said pad toward said marking device and imparts a record mark on said record sheet, means operatively related to said armature for interrupting the operative connection between said driving mechanism and said record sheet, means for returning said record sheet to its initial position when the operative connection between said driving mechanism and said record sheet is interrupted, and means for energizing said electromagnet at predetermined intervals.

20. A demand indicator comprising in combination a movable record sheet having an initial position, a gear member operatively secured to said record sheet, a driving mechanism, a lever, a second gear member mounted on said lever and adapted to be driven by said mechanism and to mesh with said first mentioned gear member, means normally tending to return said record sheet to its initial position, means for moving said lever and for disengaging said gear members at predetermined intervals, a catch arranged to engage a pin secured to said lever to hold said gear members disengaged, a second pin operatively secured to said first mentioned gear member and arranged to disengage said catch from said first mentioned pin as the record sheet reaches its initial position and a marking device operatively related to said record sheet and adapted to impart a record mark on said record sheet at the end of each of said predetermined intervals.

21. A demand indicator comprising in combination a circular record sheet having an initial position and adapted to be rotated about its center as an axis, a constant speed driving mechanism adapted to be operatively connected to said record sheet, a stationary marking device arranged on one side of said record sheet, a lever having a pad arranged on the other side of said record sheet and opposite said marking device, an electromagnet having a movable armature operatively connected to said lever so that the movement of said armature forces said pad toward said marking device and imparts a record mark on said record sheet, means operatively related to said armature for interrupting the operative connection between said driving mechanism and said record sheet, means for returning said record sheet to its initial position when the operative connection between said driving mechanism and said record sheet is interrupted, and means controlled by an electric meter element for energizing said electromagnet at the end of predetermined intervals of metered energy.

In witness whereof, I have hereunto set my hand this 30th day of July, 1913.

WILLARD E. PORTER.

Witnesses:
FRANK G. HATTIE,
HENRY A. ANDERSEN.